Oct. 14, 1952  E. SOKOLIK  2,613,570
CARPENTER'S NAIL
Filed Feb. 18, 1950  2 SHEETS—SHEET 1
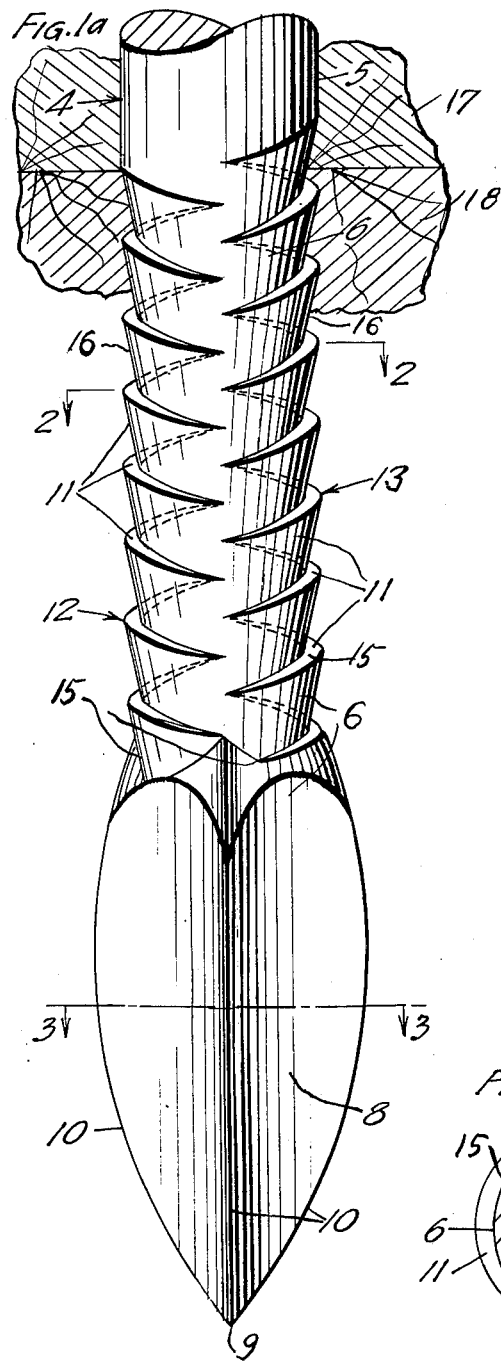
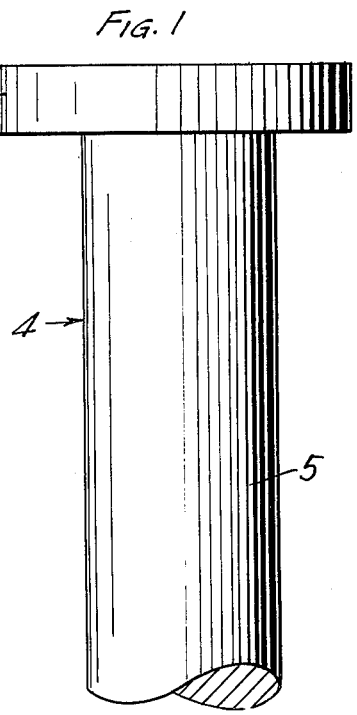
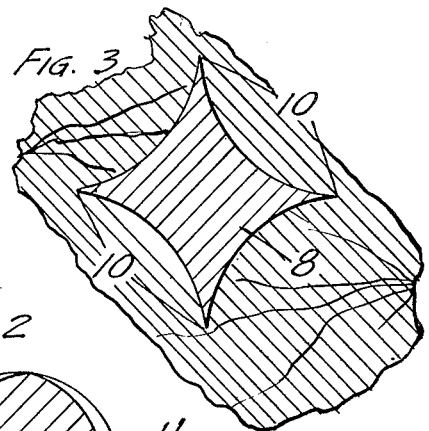
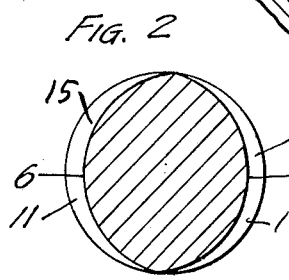
INVENTOR
EDWARD SOKOLIK Oct. 14, 1952     E. SOKOLIK     2,613,570
CARPENTER'S NAIL
Filed Feb. 18, 1950     2 SHEETS—SHEET 2
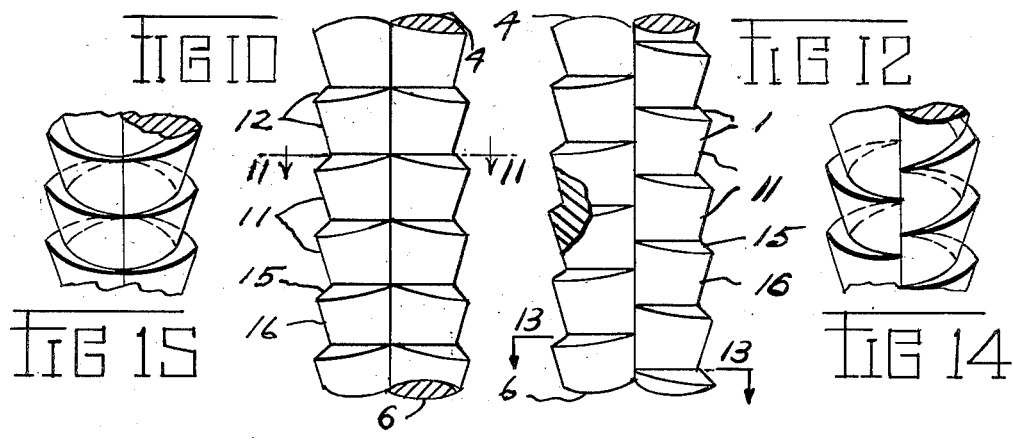
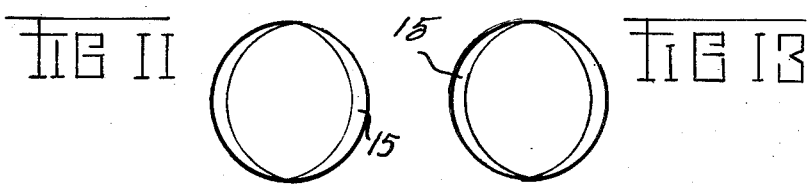
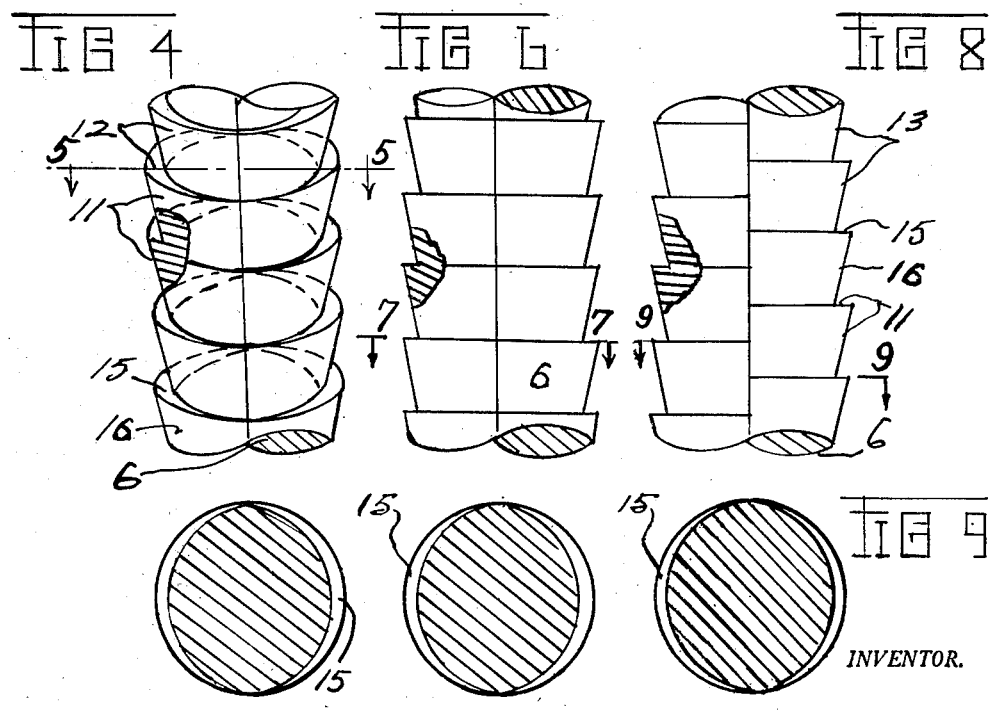
INVENTOR.
BY Edward Sokolik Patented Oct. 14, 1952

2,613,570

UNITED STATES PATENT OFFICE 2,613,570

CARPENTER'S NAIL

Edward Sokolik, New Brighton, Minn.

Original application March 29, 1946, Serial No. 658,282. Divided and this application February 18, 1950, Serial No. 145,064

3 Claims. (Cl. 85—30)

My present invention relates to improvement in carpenter's nails, and is a divisional application of my application Serial No. 658,282, filed March 29, 1946, now abandoned.

One object is to provide a nail that will nail one material or member to another.

Another object is to provide a nail that is resistant to kinking by driving impacts and is so resistant on the entire shank thereof.

Still another object is to attain the above-mentioned advantages and yet retain the normal body-strength subjacent to the head where the nail and material are susceptible to rusting and rotting.

A further object is to provide a nail with a penetrating end-portion that will sever the fibres of the material that it penetrates and thus generally prevent splitting of the mass of fibres, the objects of which are to facilitate penetration, afford anchorage, prevent rotting of the material and rusting of the nail subjacent to the head.

A further object is to provide a nail having the various features so combined, arranged and constructed so as to facilitate penetration in respect to the point and shank thereof, to prevent undue mutilation of the severed fibres in the nailed material and to have a commercial practicability.

To attain the aforementioned objectives and advantages and to eliminate the disadvantages of the art, it is necessary to produce a new combination and a new arrangement as well as some new construction of some of the features which, as this specification progresses, are described, claimed and illustrated by the accompanying drawings, in which like characters designate like parts in the various exhibits;

Figs. 1 and 1a are elevational views, showing respectively, the anchor headed upper portion and the serrated penetrating lower portion of my improved carpenter's nail on an enlarged scale.

Figs. 2 and 3 are transverse sectional views taken on the lines 2—2 and 3—3 of Figure 1a, respectively.

Fig. 4 illustrates a shank portion showing semi-helically frusto-conical, crescent-shaped serrates, with a serrate partially in section, arranged in series in two oppositely opposed semi-cylindrical columns, corresponding ends of serrates in one column abutting those of the opposite column.

Fig. 5 is a section on line 5—5, Fig. 4.

Fig. 6 illustrates a shank portion corresponding to Fig. 4 except that the serrates are semi frusto-conical instead of semi-helically frusto-conical.

Fig. 7 is a section on line 7—7, Fig. 6.

Fig. 8 illustrates a shank portion corresponding to Fig. 6 except that the serrates of one column stagger those of the oppositely opposed column.

Fig. 9 is a section on line 9—9, Fig. 8.

Fig. 10 illustrates a shank portion corresponding to Fig. 6 except that the anchor surfaces of the serrates are downwardly and outwardly sloped.

Fig. 11 is a section on line 11—11, Fig. 10.

Fig. 12 illustrates a shank portion corresponding to Fig. 10 except that the serrates of one column stagger those of the oppositely opposed column.

Fig. 13 is a section on line 13—13, Fig. 12.

Fig. 14 illustrates a shank portion corresponding to Fig. 12, except that the serrates are semi-helical.

Fig. 15 illustrates a shank portion corresponding to Fig. 10, except that the serrates are semi-helical.

The nail comprises a uniformly cylindrical shank 4 including an upper portion 5 to be imbedded in the material 17 to be nailed, and a lower portion 6 to be imbedded and anchored in the material 18 to which said first mentioned material is to be nailed. The upper portion 5 is smooth and provided on the free end thereof with an anchor head 7, whereby to anchor the material to be nailed, and the lower portion 6 has a penetrating end-portion 8 including a tip 9 and four equally bladelike cutting fins 10; and two oppositely opposed columns 11 of connected serrates 12 and 13 extending from the penetrating end-portion 8 upwardly substantially up to the centre of the shank 4 or up to the member being nailed to form a bi-semi-circumferentially serrated surface, which is in axial alignment with the circumferential surface of the upper portion 5.

The bladelike cutting fins 10 of the penetrating end-portion 8 are generally convexly arcuate from the tip 9 up to the junction 14 with the serrates 12 and 13 and have a length substantially thrice the diameter of the shank 4, thereby being adapted to sever the fibers as the material is penetrated, and adapted to facilitate withdrawal of the nail. To sever all the fibers penetrated, the combined maximum span of each two opposite cutting fins 10 is substantially equal to the diagonal of a square whose each side is of a length corresponding to the diameter of the shank 4, and the penetrating end-portion may be formed by axially compressing the end of the penetrating end-portion 8 into a blunt head and die pressing the same. Each two adjacent cutting fins 10 are generally concavely connected between the edges thereof, thereby facilitating penetration.

The ends of the serrates 12 of columns 11 preferably stagger those of the serrates 13 of the oppositely opposed column 11. Each serrate 12 and 13 is preferably helical in form, though it may be semi-frusto-conical, and has a transverse crescent-shaped anchor angle 15 perpendicular to the axis of the shank 4 or downwardly and outwardly sloped, and a depending longer angle 16 extending from the outer edge of the anchor angle 15 to the inner edge of the subjacent anchor angle 15 of the shank 4.

The depth of the anchor angle 15 and the height of the angle 16 of each serrate 12 and 13 respectively are nominally in ratio of one to five when the anchor angle 15 of the serrates 12 and 13 are perpendicular to the axis of the shank 4, and slightly deeper when sloping downwardly and outwardly.

Staggered serrates 12 and 13 make the shank 4 more resistant to kinking under nailing impacts, than if aligned, and staggered and helical serrates 12 and 13 are still more resistant to kinking than the only staggered serrates 12 and 13.

The upper portion 5 with its anchor head 7 cooperating with the lower portion 6 with its anchor serrates 12 and 13 in nailing one material to another material, while the cutting edges 10 of the penetrating end-portion 8 prevent splitting of the material penetrated, by severing the fibers thereof, and facilitate penetration and also have some of the anchoring function of serrates 12 and 13, which are anchored against the ends of the severed fibers.

It is apparent that this invention lends itself to various arrangements of the serrates which are claimed so far as embraced by the scope and spirit of the appended claims.

I claim:

1. In combination a member, a support member for said member, a uniformly cylindrical nail shank embodying a smooth upper portion embedded in the member and having an anchor head bearing against the outer face of said member; and a lower portion having a penetrating end-portion and serrates extending from the smooth portion substantially to said penetrating end-portion and together therewith embedded and anchored in the support member, said penetrating end-portion embodying four radially equally spaced-apart fiber cutting fins merging into the tip of said penetrating end-portion and extending, generally convexly arcuate, towards the serrates of said lower portion, adapted to cut when the nail shank is driven or withdrawn, each cutting fin being of a length substantially thrice the diameter of the shank, and each diametrically opposite pair of the cutting fins having a maximum transverse diameter from the edge of one cutting fin to the edge of the other, substantially equal to the diagonal of a square whose each side is equal to the diameter of the shank; whereby the cutting fins sever a mass of fibers of a minimum width corresponding to the diameter of the shank, irrespective of the radial relationship of the cutting fins to the grain of the fibers, thereby preventing splitting of the mass of fibers of which each member is composed and simultaneously causing the severed fiber end-portions to abut against and anchor the serrated portion in the support member, the surface of said penetrating point extending substantially concavely between and connecting each two adjacent fins, thereby providing channeled slideways for the severed fiber end-portions, whereby penetration by said penetrating end-portion is facilitated and prevention of splitting of the mass of fibers contributed to in cooperation with the cutting fins; the serrates being arranged and connected in series in two diametrically opposite semi-circumferential columns, each serrate including a transversely disposed, crescent-shaped, transverse anchor surface, and a longer surface depending from the outer edge of the crescent-shaped anchor surface to the inner edge of the subject anchor surface, said longer surface being of a length nominally five times the maximum depth of the crescent-shaped surface for maximum functional efficacy, the outer margin of each said crescent-shaped anchor surface being in axial alignment with the surface of said smooth upper portion, the upper and lower portions of the shank cooperating in nailing together the respective members.

2. In combination a member, a support member for said member, a uniformly cylindrical nail shank embodying a smooth upper portion embedded in the member and having an anchor head bearing against the outer face of said member; and a lower portion having a penetrating end-portion and serrates extending from the smooth portion substantially to said penetrating end-portion and together therewith embedded and anchored in the support member, said penetrating end-portion embodying four radially equally spaced-apart fiber cutting fins merging into the tip of said penetrating end-portion and extending, generally convexly arcuate, towards the serrates of said lower portion, adapted to cut when the nail shank is driven or withdrawn, each cutting fin being of a length substantially thrice the diameter of the shank, and each diametrically opposite pair of the cutting fins having a maximum transverse diameter from the edge of one cutting fin to the edge of the other, substantially equal to the diagonal of a square whose each side is equal to the diameter of the shank, whereby the cutting fins sever a mass of fibers of a minimum width corresponding to the diameter of the shank, irrespective of the radial relationship of the cutting fins to the grain of the fibers, thereby preventing splitting of the mass of fibers of which each member is composed and simultaneously causing the severed fiber end-portions to abut against and anchor the serrated portion in the support member, the surface of said penetrating point extending substantially concavely between and connecting each two adjacent fins, thereby providing channeled slideways for the severed fiber end-portions, whereby penetration by said penetrating end-portion is facilitated and prevention of splitting of the mass of fibers contributed to in cooperation with the cutting fins; the serrates being arranged and connected in series in two diametrically opposite semi-circumferential columns, each serrate including a crescent-shaped anchor surface perpendicular to the shank axis, and a longer surface depending from the outer edge of the crescent-shaped anchor surface to the inner edge of the subjacent anchor surface, said longer surface being of a length nominally five times the maximum depth of the crescent-shaped surface for maximum functional efficacy, the outer margin of each said crescent-shaped anchor surface being in axial alignment with the surface of said smooth upper portion, the upper and lower portions of the shank cooperating in nailing together the respective members.

3. In combination a member, a support member for said member, a uniformly cylindrical nail shank embodying a smooth upper portion embedded in the member and having an anchor head bearing against the outer face of said member; and a lower portion having a penetrating end-portion and serrates extending from the smooth portion substantially to said penetrating end-portion and together therewith embedded and anchored in the support member, said penetrating end-portion embodying four radially equally spaced-apart fiber cutting fins merging into the tip of said penetrating end-portion and extending, generally convexly arcuate, towards the serrates of said lower portion, adapted to cut when the nail shank is driven or withdrawn, each cutting fin being of a length substantially thrice the diameter of the shank, and each diametrically opposite pair of the cutting fins having a maximum transverse diameter from the edge of one cutting fin to the edge of the other, substantially equal to the diagonal of a square whose each side is equal to the diameter of the shank; whereby the cutting fins sever a mass of fibers of a minimum width corresponding to the diameter of the shank, irrespective of the radial relationship of the cutting fins to the grain of the fibers, thereby preventing splitting of the mass of fibers of which each member is composed and simultaneously causing the severed fiber end-portions to abut against and anchor the serrated portion in the support member, the surface of said penetrating point extending substantially concavely between and connecting each two adjacent fins, thereby providing channeled slideways for the severed fiber end-portions, whereby penetration by said penetrating end-portion is facilitated and prevention of splitting of the mass of fibers contributed to in cooperation with the cutting fins; the serrates being arranged and connected in series in two diametrically opposite semi-circumferential columns, each serrate including a crescent-shaped, outwardly and downwardly sloping transverse anchor surface, and a longer surface depending from the outer edge of the crescent-shaped anchor surface to the inner edge of the subjacent anchor surface, said longer surface being of a length nominally five times the maximum depth of the crescent-shaped surface for maximum functional efficacy, the outer margin of each said crescent-shaped anchor surface being in axial alignment with the surface of said smooth upper portion, the upper and lower portions of the shank cooperating in nailing together the respective members.

EDWARD SOKOLIK.

REFERENCES CITED

The following references are of record in the file of this patent:

UNITED STATES PATENTS

| Number | Name | Date |
|---|---|---|
| 2,182 | Ballard | July 17, 1841 |
| 59,434 | Merrill | Nov. 6, 1866 |
| 1,109,328 | Evans | Sept. 1, 1914 |
| 1,360,344 | Wood et al. | Nov. 30, 1920 |
| 1,932,358 | Thompson | Oct. 24, 1933 |
| 1,978,145 | Rosenberg | Oct. 23, 1934 |

FOREIGN PATENTS

| Number | Country | Date |
|---|---|---|
| 5,726 | Great Britain | Mar. 23, 1892 |